(12) United States Patent
Muchka et al.

(10) Patent No.: US 11,967,056 B2
(45) Date of Patent: Apr. 23, 2024

(54) SYSTEMS, METHODS AND APPARATUSES FOR DETECTING AND ANALYZING DEFECTS IN UNDERGROUND INFRASTRUCTURE SYSTEMS (71) Applicant: INFRASTRUCTURE DL, LLC, Dousman, WI (US)

(72) Inventors: Robert Muchka, Oconomowoc, WI (US); Michael Surwillo, Milwaukee, WI (US)

(73) Assignee: Infrastructure DL, LLC, Oconomowoc, WI (US)

( * ) Notice: Subject to any disclaimer, the term of this patent is extended or adjusted under 35 U.S.C. 154(b) by 345 days.

(21) Appl. No.: 17/475,456

(22) Filed: Sep. 15, 2021

(65) Prior Publication Data
US 2022/0207693 A1    Jun. 30, 2022

Related U.S. Application Data

(60) Provisional application No. 63/132,845, filed on Dec. 31, 2020.

(51) Int. Cl.
*G06T 7/00*     (2017.01)
*G01N 21/954*   (2006.01)

(52) U.S. Cl.
CPC ......... *G06T 7/0002* (2013.01); *G01N 21/954* (2013.01); *G06T 2207/10016* (2013.01)

(58) Field of Classification Search
None
See application file for complete search history.

(56) References Cited

U.S. PATENT DOCUMENTS

| 4,974,168 | A | 11/1990 | Marx |
| 9,081,917 | B2* | 7/2015 | Currin ................... H04L 67/10 |
| 10,648,820 | B2* | 5/2020 | Anderson ............ A01B 69/008 |
| 2003/0023404 | A1 | 1/2003 | Moselhi et al. |
| 2015/0112647 | A1* | 4/2015 | Currin ................... H04L 67/10 |
| | | | 703/1 |
| 2017/0076911 | A1 | 3/2017 | Chen et al. |
| 2022/0207693 | A1* | 6/2022 | Muchka ............... G01N 21/954 |

OTHER PUBLICATIONS

W. Guo, L. Soibelman, J.H. Garrett, Automated defect detection for sewer pipeline inspection and condition assessment, Automation in Construction, vol. 18, Issue 5, 2009, pp. 587-596, ISSN 0926-5805, https://doi.org/10.1016/j.autcon.2008.12.003. (Year: 2009).*
Yin et al., A Deep Learning-Based Framework for an Automated Defect Detection System for Sewer Pipes; Automation in Construction; 109 (102967), 2020 (17 pgs).
International Search Report and Written Opinion from PCT/US2021/063772 dated Mar. 10, 2022; 10 pgs.

* cited by examiner

*Primary Examiner* — Tahmina N Ansari
(74) *Attorney, Agent, or Firm* — RYAN KROMHOLZ & MANION, S.C.

(57) ABSTRACT

Systems, methods and devices for performing analysis of surfaces, external and internal, including public works. The invention employs analytical software that provides results independent of the limitations of the operator.

14 Claims, 10 Drawing Sheets

Darknet framework:

✓ Loads 106 layers

✓ Detection at layers: 82, 94 and 106

*Fig. 9*

| Street | Up Stream Manhole | Down Stream Manhole | Footage | Pipe Size | Pipe Material | Defect | Severity | Image | Video | Overall Pipe Grade |
|---|---|---|---|---|---|---|---|---|---|---|
| 123 N. 15th Street | 34 | 35 | 28.6 ft | 8 inch | PVC | Mineral Deposits | 5 | imbedded picture link of defect | | 3 |
| 123 N. 15th Street | 34 | 35 | 50.09 ft | 8 inch | PVC | Roots fine | 1 | imbedded picture link of defect | **imbedded video link of current pipe | 3 |
| 123 N. 15th Street | 34 | 35 | 1201.3 ft | 8 inch | PVC | Offset Joint Medium | 3 | imbedded picture link of defect | | |
| 157 N. 15th Street | 208 | 209 | 15.0 ft | 10 inch | PVC | Tap Factory Made, 7'oclock | 0 | imbedded picture link of defect | **imbedded video link of current pipe | 3 |
| 157 N. 15th Street | 208 | 209 | 135.7 | 10 inch | PVC | Pipe Broken Hole | 4 | imbedded picture link of defect | | |
| 157 N. 15th Street | 208 | 209 | 150.5 ft | 10 inch | PVC | Debris Obstruction Sediment | 2 | imbedded picture link of defect | | |
| 157 N. 15th Street | 208 | 209 | 170.2 ft | 10 inch | PVC | Roots fine | 1 | imbedded picture link of defect | | |
| 179 N. 15th Street | 23 | 24 | 16.1 ft | 10 inch | PVC | Roots Heavy | 4 | imbedded picture link of defect | **imbedded video link of current pipe | 4 |
| 179 N. 15th Street | 23 | 24 | 76.2 ft | 10 inch | PVC | Tap Factory Made, 9'oclock | 1 | imbedded picture link of defect | | |

*Fig. 10*

| Processed Video | Street Address | Starting Manhole | Ending Manhole | Pipe Material / Diameter | Footage | Defect | Severity | Overall Pipe Grade |
|---|---|---|---|---|---|---|---|---|
| processed_video.avi | 123 Fake Street | 234 | 235 | Clay / 8" | 0005 | Roots, Fine | 1 | 1 |
| | | | | | 0007 | Roots, Fine | 1 | 1 |
| | | | | | 0008 | Joint | 3 | 1.666666 |
| | | | | | 0011 | Joint | 5 | 2.5 |
| | | | | | 0012 | Roots, Medium | 4 | 2.8 |
| | | | | | 0014 | Offset Joint, Slight | 2 | 2.666666 |
| | | | | | 0014 | Joint | 0 | 2.666666 |
| | | | | | 0015 | Tap, Factory Made | 2 | 2.666666 |
| | | | | | 0015 | Protruding, Tap | 3 | 2.714285 |
| | | | | | 0016 | Cracks, Multiple | 5 | 3 |
| | | | | | 0017 | Joint | 0 | 3 |
| | | | | | 0020 | Joint | 0 | 3 |
| | | | | | 0023 | Encrustation, Mineral Deposit, Light | 3 | 3 |
| | | | | | 0024 | Joint | 0 | 3 |
| | | | | | 0026 | Cracks, Multiple | 5 | 3.2 |
| | | | | | 0029 | Joint | 0 | 3.2 |
| | | | | | 0030 | Joint | 0 | 3.2 |
| | | | | | 0031 | Tap, Factory Made, Capped | 2 | 3.2 |
| | | | | | 0032 | Circumferential Crack | 0 | 3.090909 |
| | | | | | 0034 | Joint | 0 | 3.090909 |
| | | | | | 0035 | Infiltration, Runners | 4 | 3.166666 |
| | | | | | 0036 | Joint | 0 | 3.166666 |
| | | | | | 0038 | Manhole | 0 | 3.166666 |

When an end user clicks this link, the video with the defects identified with boxes will pop up and start playing.

When an end user clicks on the hyperlinked image, an image will display with the corresponding box around the defect, giving the user quick access to view the defect.

0 ——— Black
1 ········· Green
2 — — Blue
3 ········· Yellow
4 ·········· Pink
5 ——— Red

SYSTEMS, METHODS AND APPARATUSES FOR DETECTING AND ANALYZING DEFECTS IN UNDERGROUND INFRASTRUCTURE SYSTEMS

RELATED APPLICATIONS

The present application claims priority to U.S. provisional application, Ser. No. 63/132,845, filed on Dec. 31, 2020.

BACKGROUND OF THE INVENTION

The present invention is directed towards evaluation of defects in internal surfaces. Particularly, the present invention is directed towards evaluation of defects in underground Sewer and Water infrastructure, and, more specifically to systems and methods for standardizing the evaluation of such defects.

History repeats itself, especially when it comes to sewerage drainage and its influence on drinking water. As early as 4000 BC there is evidence of surface-based storm drainage systems in the Babylonian and Mesopotamian Empires. After 3000 BC, Minoans and Harappans in Crete and the Indus Valley developed basic sewerage and drainage technologies.

Over centuries, civilization realized sewerage had to be removed from drinking water sources for healthy societies to flourish. Prior to AD 300, various civilizations had well organized sewerage and drainage systems utilizing the basics of hydraulics of sewerage and drainage systems technologies.

Terra Cotta was the forerunner of vitrified clay tile sewers. Vitrified clay tile sewers are still in use throughout the United States today. Brick sewers to a lesser degree than vitrified clay, are still in service today. There are still many brick manhole structures in use.

Maintenance of sewers through storm water and wastewater drainage were employed from 3200 BC during the Bronze Age. Some sewers were large enough to walk through and are still in service today in Crete.

As with many technologies discovered and cultivated, the sewer and water technologies deteriorated during the "Dark Ages." It wasn't until a series of cholera epidemics started during the 1830's precipitating, the reawakening of sewer drainage technology, which resumed vigorously. In Paris, new and bigger sewers (called "les egouts") were constructed from the 1830's through 1930. Six foot plus high sewers, in Paris, allowed people to walk the sewers standing up to clean them.

In the late $19^{th}$ century, American sewer systems were being designed as both combined and separate systems. Due to the robust hydraulic systems in the form or rivers, streams, lakes, and oceans, discharge of sewerage into these drinking water sources was common place. As late as 1993, a cryptosporidium outbreak, the worst in US history, was encountered in Milwaukee, WI In theory, a major contributing factor was sewer overflows released into rivers entering a northern Milwaukee Lake Michigan bay basin. It is suggested that the cryptosporidium bacteria, through lake currents, introduced the bacteria into a Southern Milwaukee water treatment plant intake pipe, which was 1 mile out into Lake Michigan.

Original sewer inspections were done to make certain the hydraulics of a sewer system moved human waste from urban areas to discharge points in rivers, streams, lakes, and oceans. Sewer maintenance was employed to move and remove odorous sewerage to areas outside concentrated population areas. Dilution of sewerage through the introduction of storm water runoff was a common historical practice.

Lamp holes (10"-13" in diameter) were employed at grade level for viewing into sewers to see if the sewerage was flowing. These lamp holes were ineffectual as maintenance access points. Manholes (24" inches diameter) were created for two purposes. The first purpose was an efficient access point for sewer inspection and cleaning. Second purpose was as areas of ventilation through which vented manhole covers release sewerage gases.

In 1926, the largest activated sludge waste water facility in the worlds was constructed in Milwaukee, WI The advent of wastewater treatment plant systems encountered treatment capacity issues created by rain events. Rain events caused infiltration to penetrate the sewerage collection system. Infiltration is ground water that penetrates defects in pipe and manholes, which overwhelms the wastewater collection systems. This overwhelming or surcharging causes wastewater treatment plants to completely bypass or partially bypass the wastewater treatment process and dump untreated or partially treated sewerage into rivers, streams, lakes, and oceans.

Rain event capacity issues created a need for pipeline inspection. Interior pipeline inspection was needed not only to determine how to mitigate sewer infiltration capacity issues, but to locate where pipe deterioration and sewer backup issues.

Many sewerage collection systems separated out the storm sewer run off discharge systems from the sanitary sewerage system to help combat sewerage treatment capacity issues.

Sewer inspections have evolved. Twentieth century pipe inspection techniques include Lamping inspection, visual inspection, cameras, and closed-circuit television (CCTV) inspection.

Visual Inspection is actively viewing internal pipes large enough for human entrance. If manhole access was not feasible, mirrors were placed at adjacent manholes to reflect the interior of the sewer line.

Lamping is placement of a camera into a maintenance hole and positioning the camera at the center of the junction of a manhole frame and sewer. The camera then records the visual image of the pipe interior from the camera positioning.

Cameras, during the late twentieth century, were placed in cabled secure skid systems and winched through smaller sewers recording information from the entrance to exit manholes. Often in larger sewer pipes containing substantial hydraulic flow rafts or boats were used to transport camera recording equipment along with personnel. One such instance was a six mile voyage throughout the North Outfall sewer in Los Angeles, CA, made by Reuben Brown, which began of Jul. 4, 1935. Rueben Brown used a nine foot long boat traversing 500 to 2,000 foot increments, taking photographs, and making detailed visual inspections of the interior of 10.5 foot high and 12 foot 3 inch wide elliptical pipe.

Closed circuit television (CCTV) is currently the most cost effective and most common technique used to gather interior pipe surface defect information. Closed circuit televising systems are comprised of multi-conductor cable systems connected to CCTV cameras, tractor conveyance systems and truck mounted computer systems. These CCTV systems are deployed by lowering a sewer camera and transport system into existing manholes, outfalls or access points to traverse through sewers and watermains while collecting video documentation of pipe defects and pipe surface condition.

In 1980, an effort to standardize sewer condition assessment was created. The National Water Council in England published and released the first edition of a "Manual of Sewer Condition Classification" (MSCC). Pipe condition grading was first devised by The Water Research Centre (WRC) in the United Kingdom. This pipe condition grading system used structural and serviceability defects with a weighting equation for evaluating pipes. Utilizing defect recognition, defect coding, defect scoring and aggregate scores pipe grading is achieved through the use of maintenance and structural weighted algorithms. In 2002, the National Association of Sewer Service Companies (NASSCO) created a pipeline assessment and certification training program. This assessment and certification was created with the help of the WRC. The Pipeline Assessment and Certification Program (PACP) was created to develop a standardized method of pipe condition assessment throughout the United States. In recent years, "Lateral Assessment and certification Program (LACP) and Manhole Assessment and Certification Program (MACP) were added to the assessment and certification programs by NASSCO.

In a Tech Tips article, from NASSCO, (Edition 38, June 2016, *Understanding Defect Grades*, it was noted "The CCTV user should understand that the condition grade of a particular defect depends upon the correct PACP code being entered and not each operator's opinion. Only by allowing the grades to be assigned through accurate PACP coding will the condition grades be consistent. Otherwise, we lose the benefits of standardization when codes are based on each operator's opinion and not what is actually observed.

Facial recognition was the birth place of computerized object identification. In the 1960s, Woodrow Wilson Bledsoe manually recorded coordinate locations of facial features on a Rand tablet. It wasn't until late 1980s to early 1990s that significant facial recognition developments would be made, in the form of an application of linear algebra. The Eigenface approach implemented by Sirovich and Kirby started as a low-dimensional representation of facial images. The Eigenface method is used as the basis of many deep learning algorithms today.

ImageNet put forth an annual large scale visual recognition challenge, which "exists to evaluate the ability of algorithms to correctly classify images within its repository to increasing degrees of accuracy." As a result of ImageNet challenge, classification error rates had been reduced from approximately 25% in 2010 to a classification error rate of 3.6% in 2015.

Computer image recognition technology breakthroughs continue as a result of the continual exponential increase of low cost computing resources along with research lab advancements on image processing.

However, with all of these advancements to date, there still is a need for a more consistent sewer evaluation system, wherein the results are replicated, even if there are variables, such as the operator or visualization of the sewer or water system that are inconsistent. Both the CCTV operators and engineering CCTV report evaluators are subject to human error, operator tendencies, operator and report evaluator fatigue, and employment production requirements which can lead to inconsistencies, even with standards in place.

There is also room for improvement with surface evaluation systems in general, to provide consistent results when evaluating surfaces. For example, systems such as are disclosed in U.S. Pat. No. 9,081,917, attempt to manage sewer systems with algorithms and cloud computing to provide an accurate assessment of a sewer system and layout to determine areas of concerns. However, the system, as with other prior art systems is based largely on an individual's assessment and allows for a reviewer to change the rating of a defect.

SUMMARY OF THE INVENTION

The present invention is directed toward devices, systems and methods for analyzing defects in sewer and water systems. The invention utilizes a software tool that will provide accurate analysis of a sewer system, with the analysis being consistent.

The intention of the present invention generally comprises a video file of a system that is input into the software tool, and a report that is output from the software tool.

The invention contains a weight system that has been trained based off tens of thousands of defects. These weights are used to analyze video an end user provides.

In another aspect of the present invention, the invention is directed toward identification of sewer and water piping that require repair or replacement.

In another aspect of the invention, the invention is directed towards the preparation of a report of sewer defects that will be free of human error. In a further aspect of the report, the report is color coded related to the type and severity of the defects.

In another aspect of the present invention, the invention comprises a method of analyzing defects in sewer systems, wherein a video or videos of sewer defects are input into a software program. The software program analyzes the videos an end user provides for particular sewer or water system into the software program. The software program utilizes the trained weight to determine the severity and the type of defects within the particular sewer system. The software program further weights the various defects in the particular sewer or water system and provides a detailed report of the defects. The report can be directly used to address the defects of the particular sewer system.

The present invention also is directed towards methods and devices for analyzing defects in internal and external surfaces of various objects, structures and surfaces.

BRIEF DESCRIPTION OF THE DRAWINGS

FIG. 9 is an example of an analysis carried out according to the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

The present invention provides systems, methods and devices for evaluating defects in various surfaces. Often because of various contours in a surface, as well as variables such as the lighting, certain defects of a surface may or may not be viewed properly. One angle may reveal a defect, while another angle may obscure the defect. Similarly, two individuals may notice or depict the same defect in different ways. In such situations, you may have divergent analyses of various defects.

Figure 1:
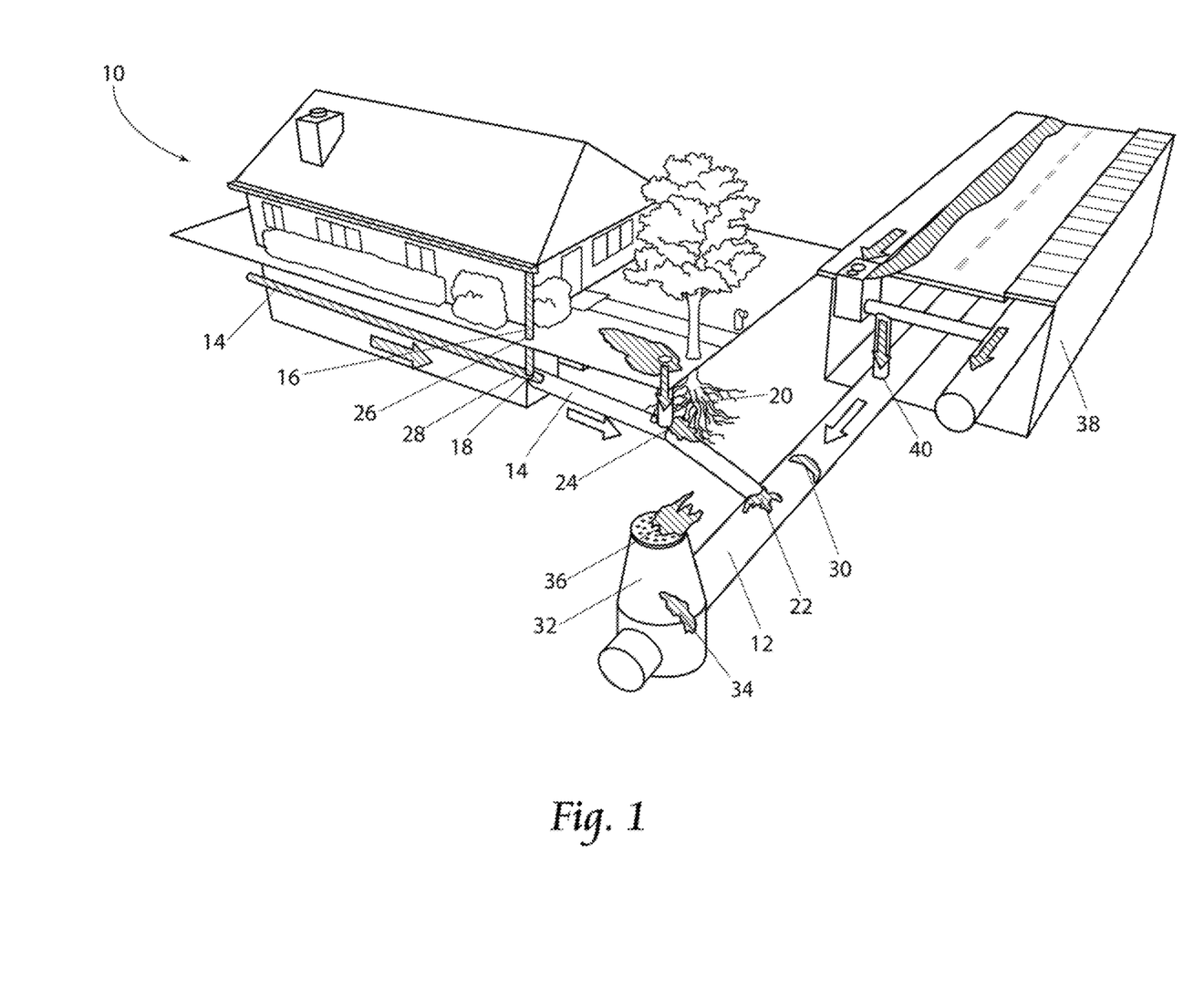
FIG. 1 is a perspective view of a sewer system depicting various areas where faults or defects may occur in the sewer system.

FIG. 1 depicts a typical municipal sewer system 10 with various potential defects in the sewer system. The system generally comprises a sewer main 12, with one more laterals 14 connected to the sewer main 12. The laterals 14 are connected to individual drains or accesses in a typical sewer systems. For example, the lateral could be connected to a roof drain 16, a foundation drain 18, and/or a lateral cleanout 20. Each of these elements and connections may be the basis for a defect.

Joints can also separate where two sections of sewer pipe are connected to one another. These separated joints, cracks or broken pipes can be formed for varying reasons, such as tree roots encroaching on the sewer lines, soil settlement, utilities directional drilling or landscaping. For example, the connection 22 of the lateral 14 to the sewer, the connection 24 of the lateral 14 to the lateral cleanout 20, the connection 26 of the roof drain 16 to the lateral 14, or connection 28 of the foundation drain to the lateral 14 could all be sources of defects in the sewer main 12.

The defects can also include a crack 30 in a pipe, e.g. in the sewer main 12. In addition to such defects, defects can also occur when there are defective manholes 32, such as a deteriorated manhole 34 or a faulty manhole cover 36, which have similar and varying defects in vertical sewer structures that are connected to the horizontal sewer system.

Defects also often times occur at the junction where a storm sewer 38 connects 40 to the sewer main. Many times the defects are not readily apparent and are more noticeable when there is a large flow of water. For example, during a storm, the flow from several laterals 14 in a municipality may overwhelm the sewer main 12, which may reveal defects that would otherwise not be detectable during normal operating parameters. In each of these situations, it is advantageous to not only properly point out a defect, but also assess the severity of the defect.

The present invention provides an improved process for detecting defects in the sewer system. Any operator will take a video or videos of the internal sewer system, which will then be entered or downloaded into the infrastructure analyzing tool of the present invention. The operator will take a video of the entire length of the sewer pipe or lateral that is being analyzed. Ideally, the video will be of high quality to insure a clear picture of the inside of the particular sewer pipe.

The present invention is unique in that the quality of the analysis and report produced by the present invention is not determinative by the operator taking the video of the sewer pipe or the project manager reviewing the video. Instead, the present invention provides a consistent, standard analysis of the possible defects, regardless of the operators' abilities.

For example, the CCTV operator may take videos under a variety of conditions, such as on a busy thoroughfare in the middle of the night, or in a quiet residential neighborhood. Similarly, an engineer or project manager may review a video with a tendency to review or notice certain defects more often than others, and a different project manager may have different tendencies when reviewing video footage. This could generate reports that would be delivered with varying determinative results. As will be discussed in further detail below, the present invention provides for uniformity and consistency of detecting defect, regardless of the differences noted in each of the scenarios above.

Referring to FIG. 1, the noted lateral cleanout 20 is shown, with tree roots being the cause of the defect. As mentioned above, an operator could be examining the sewer during the day or at night, in clear or cloudy situations, where the tree and the tree roots may or may not be noted or related to the sewer defect. Depending on the significance given to the cleanout 20 and the related tree roots by the CCTV operator, the reviewing engineer or project manager could give different levels of seriousness to the defect. The present invention addresses such disparities.

Figure 2:
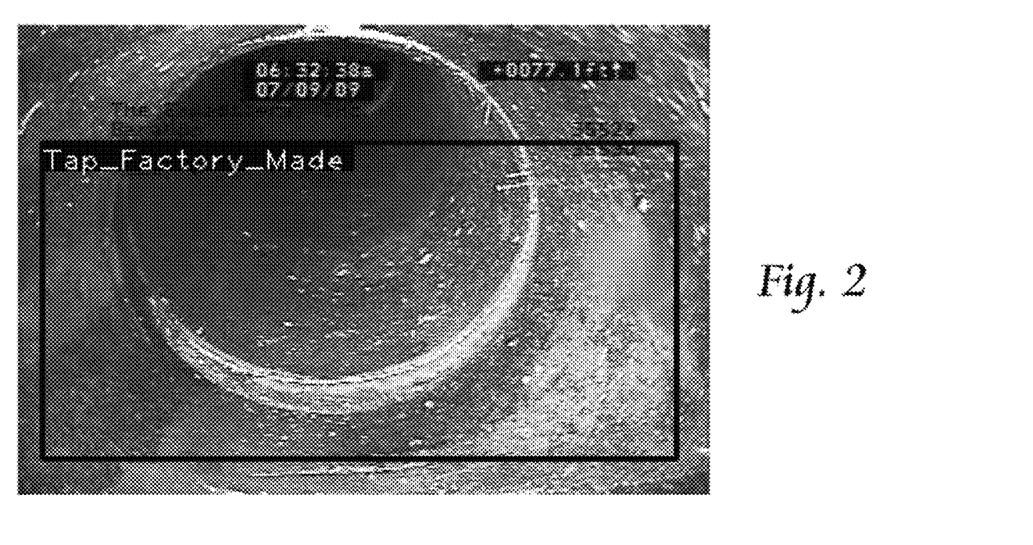
FIG. 2 provides a camera view of a sewer pipe with a defect shown.

For example FIGS. 2-5 show various defects and bounding boxes within a sewer pipe taken from a video of the sewer pipe. FIG. 2 shows a frame and a bounding box of a sewer pipe having a factory made tap, for example a preformed pipe fitting built into the sewer during construction. Depending on the person reviewing the video, the tap may be viewed as a different type of defect, e.g. a break-in, and may be analyzed or assessed compared to a second person reviewing the video. The present invention provides a proper labeling and assessment of the area as a factory made tap, regardless of the person reviewing the video and removes potential mislabeling of the area or defect.

Figure 5:
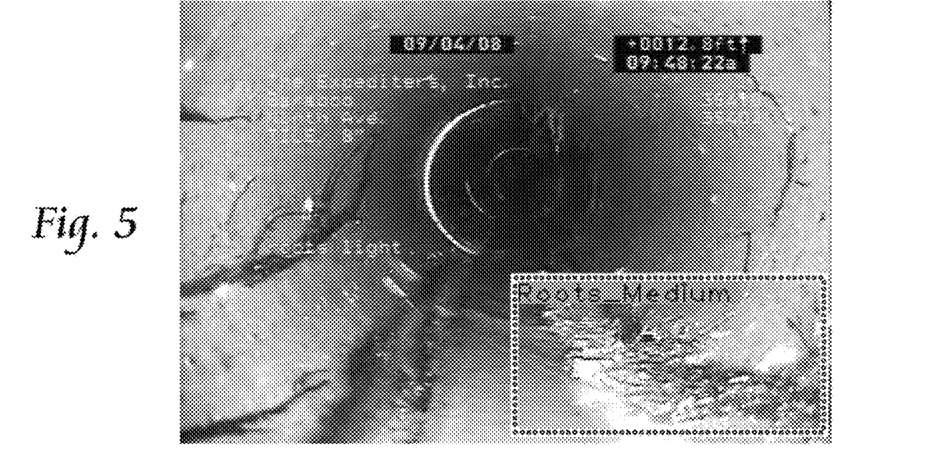
FIG. 5 provides a camera view of a sewer pipe

Similarly, FIGS. 3-6 show roots encroaching within the sewer pipe. As noted from the captured bounding boxes, the defects range from root encroachment on the lower range of concern (fine) (FIGS. 3 and 4) to root encroachment of high concern (heavy ball of roots) (FIG. 6) and root encroachment of a level of concern in between (medium) (FIG. 5).

Figure 3:
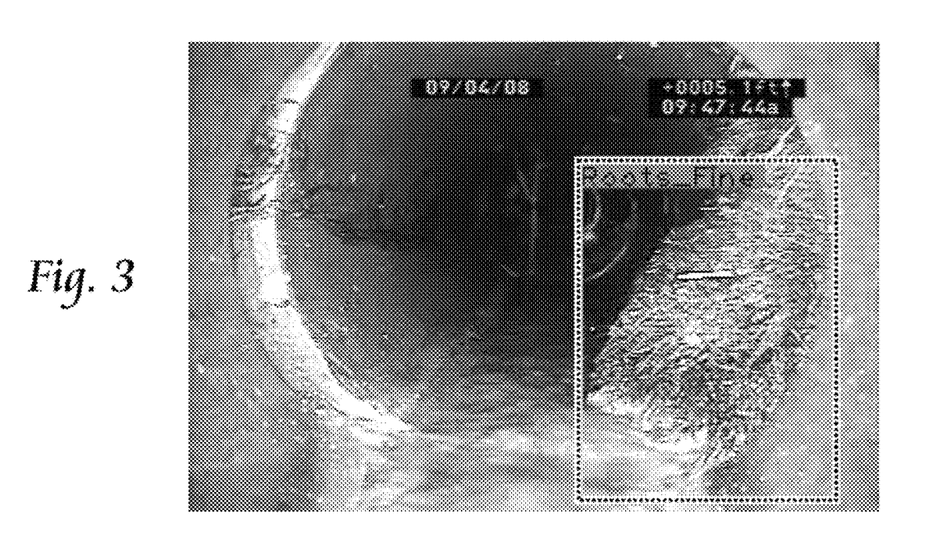
FIG. 3 provides a camera view of a sewer pipe with a further defect shown.
Figure 4:
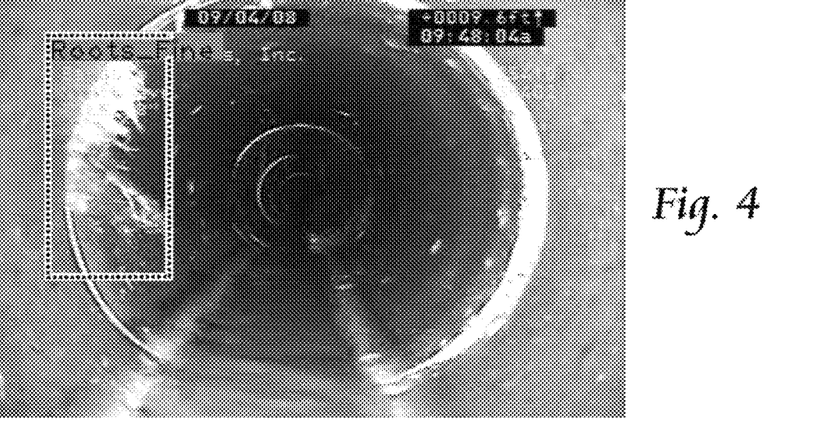
FIG. 4 provides a camera view of a sewer pipe with another defect shown.

As discussed, personal observations may provide a different analysis then noted in the Figures. FIG. 3 may be perceived as being a more sever root encroachment than FIG. 5 from what is shown in the frame. The reviewer may incorrectly label FIG. 5 as "fine" and FIG. 3 as "medium". The review potentially would not have taken into account the potential length and overall area of the root encroachment may not be fully appreciated from the observation. The present invention addresses such omissions and incorrect analysis, as the method and process take out such subjective reviews.

Figure 7:
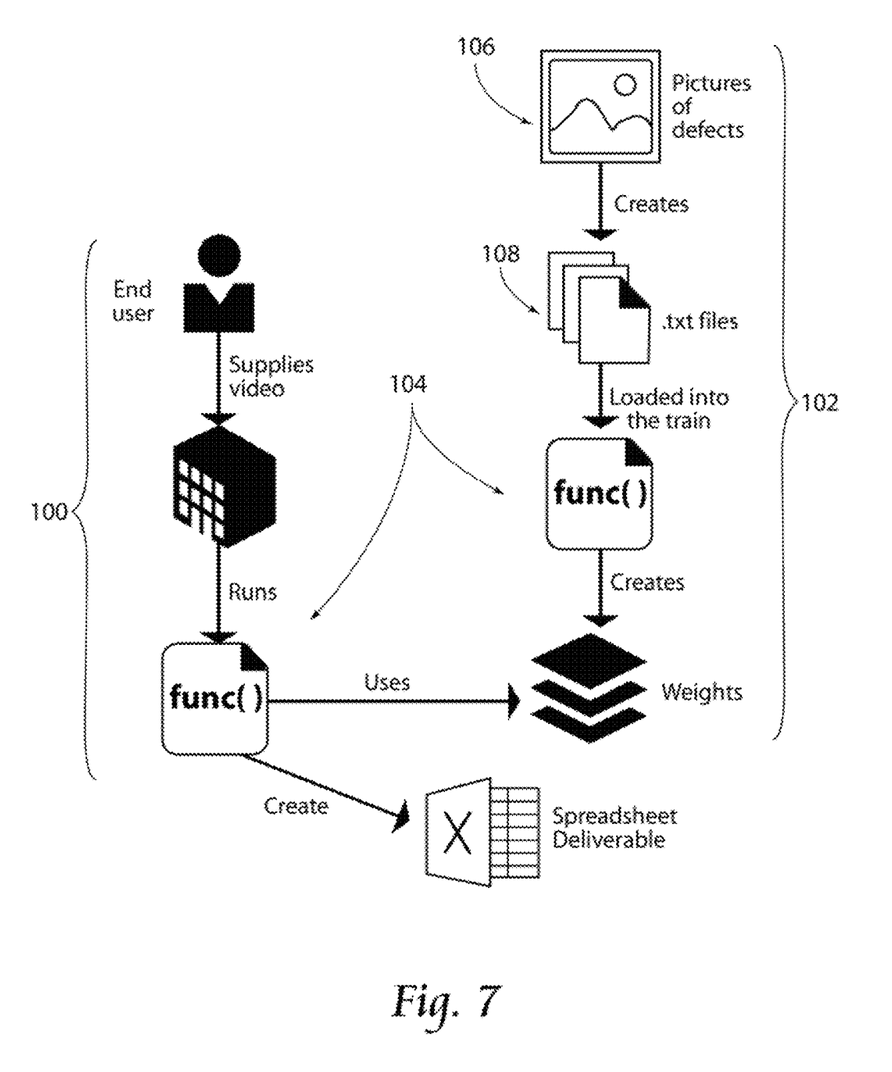
FIG. 7 is a flow chart of the method and software tool according to the present invention.

Referring now to FIG. 7, a flowchart of the data analysis tool 100 and software used in the present invention is presented. The analysis tool will provide a computer generated defect analysis. The analysis tool comprises two particular portions, a key (weight) 102, and an analysis routine 104. The key or weight 102 is formulated through the analysis of various pictures and videos of defects 106, which will then be converted into .txt files 108. These files are then loaded into the analysis tool 104, which will help train the tool 100 to create a database of various defects and various severities for these defects that corresponds to standards of the industry. The key (weight) 102 provides a weighted analysis for the defects based on the defect severity.

Once the key 102 is established, the analysis tool 100 and software will now be employed to analyze a particular video. The video will be downloaded to the analysis tool. The analysis tool then begins to run the software and analyze the data based on the key portion of the analysis tool. Once the entirety of the video has been processed, a report will be delivered by the software tool. Examples of such reports are shown in FIGS. 10-12A.

Figure 8A:
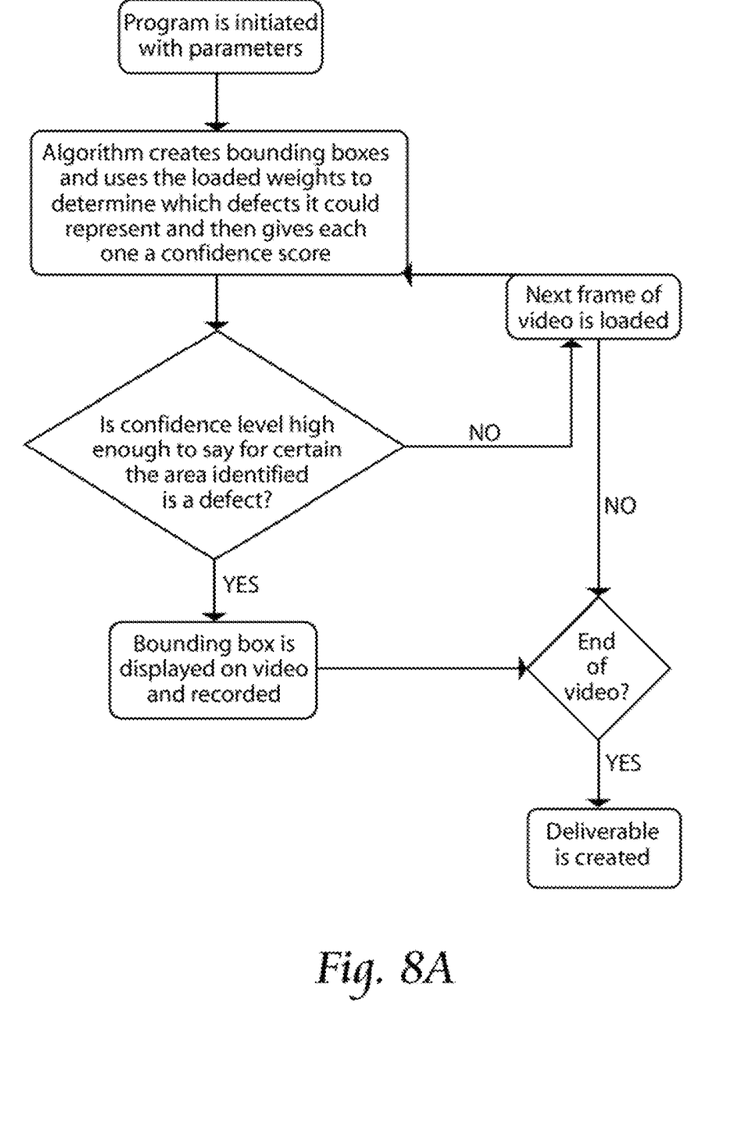
FIG. 8A is a further flow chart of the method and software tool according to the present invention.
Figure 8B:
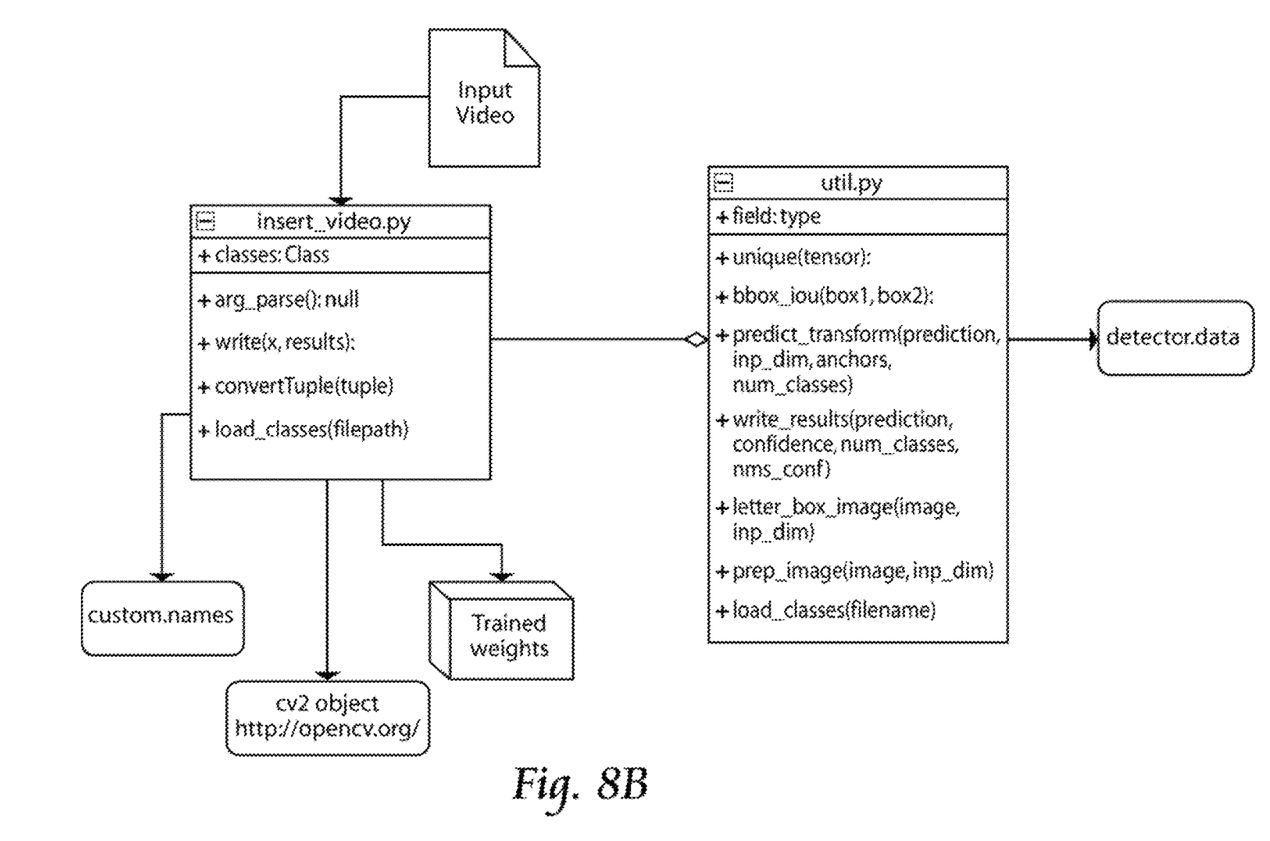
FIG. 8B further demonstrates examples of computer code that can be used to carry out the method and software tool according to the present invention.

FIGS. 8A and 8B provide flow charts demonstrating a further example of how the analysis tool operates and runs. The analysis tool 100 is initiated, with video or images supplied to the analysis tool 100. The algorithm of the analysis tool then analyzes a frame of the video to create bounding boxes and uses the key to determine potential defects and the confidence of whether or not the frame depicts an actual defect. If the confidence is high enough, the bounding box is displayed and recorded. If not, another frame will be loaded to determine sufficient confidence if or if not a defect is shown. The process will continue until the entire video is processed and a report is created.

To carry out the analysis as described above, the analysis tool utilizes an open source detection algorithm as the back bone for the analysis tool 100. FIG. 9 provides an example of such an analysis. The detection algorithm is an object detection algorithm. Such algorithms come with a pre-trained model that was trained by analyzing everyday objects, such as bicycles, stop signs, people, dogs, and cats.

One such example is YOLOv3, which is described in detail at a website hosted by Cornell University, Https://arxiv.org/abs/1804.02767. The YOLO algorithm is deployed in Darknet (see FIG. 3), which is an open source neural network written in C and CUDA. This algorithm is deployed in Tensorflow with Python 3 source code.

Tensorflow is a free and open-source software library for machine learning. Tensorflow is a symbolic math library based on dataflow and differentiable programming, created and developed by the Google Brain team. Tensors are operations that neural networks perform on multidimensional data arrays.

The present invention employs YOLOv3 in Tensorflow, using convolutional neural networks (CNN), and will be carried out on the Linux Operating System. As noted above, YOLOv3 is an object detection algorithm. This algorithm not only predicts class labels, but detects the location of the objects, as well. The single neural network (NN) application detects multiple objects, predicts classes, identifies locations, divides the image into grid cells, produces cells' probabilities and predicts bounding boxes that are weighted by predicted probabilities.

Referring particularly back to the analysis tool 100 described in FIG. 2, the key was developed by analyzing sewer data, which was gathered by a Professional Sewer Televising team, which was then certified and checked by another Qualified Professional team, to ensure the key is based on "good" data and not "bad" data. The gathered data comprises several hundred images for a defined defect, and the images are screen scraped for personally identifiable information (PII). The defects are then boxed out as fine an image as possible to ensure maximum quality and precision.

A .txt file is then created containing the coordinates of the defect(s) for each image. These files and images are then input into the Darknet framework for training purpose to develop the key. The key is then utilized as described above with respect to FIG. 2.

As discussed above, the key is weighted and is done to compare and contrast the images captured from a video. The .txt files and images from the video are input to the Darknet detect code, which then randomly takes 64 images and their corresponding .txt files to determine the accuracy of the inputted image. For example, the random image and .txt file are directed to a "Roots Fine" analysis, which is catalogued. The code will then continue to take 64 more batches of images and apply what was previously catalogued to improve the confidence level of the analysis. The second batch of images may be a further "Roots Fine" image or a different but similar image, e.g. "Multiple Cracks", and will be further catalogued. The analysis continues until the confidence level outputted is around 98% for every image. After multiple iterations, e.g. 1000 iterations, a new weight file is created having a confidence level of the image accuracy at around 98%. In time, each of the further weighted files will have more confidence than the previous. As such, the present invention provides analysis for an overall system at a high level of confidence, e.g. a confidence level over 95%.

The present invention further provides advantages over prior art methods and systems, in that the analysis tool is capable of analyzing an area when an object is not detected. That is, while YOLOv3 and other similar algorithms were developed to detect objects within a bounding box, the present invention is designed to detect when an object is not there in addition to detection of an object, which would be the indication of a defect in the system. Because the key (weights) used as the basis of the analysis is designed to independently assess, catalogue, and weight defects, the present invention provides analysis and results that are not influences by subjective review by either a CCTV operator or another person's interpretation of the CCTV video. As a result, the present invention can deliver an independent assessment and report of systems defects.

Figure 10:
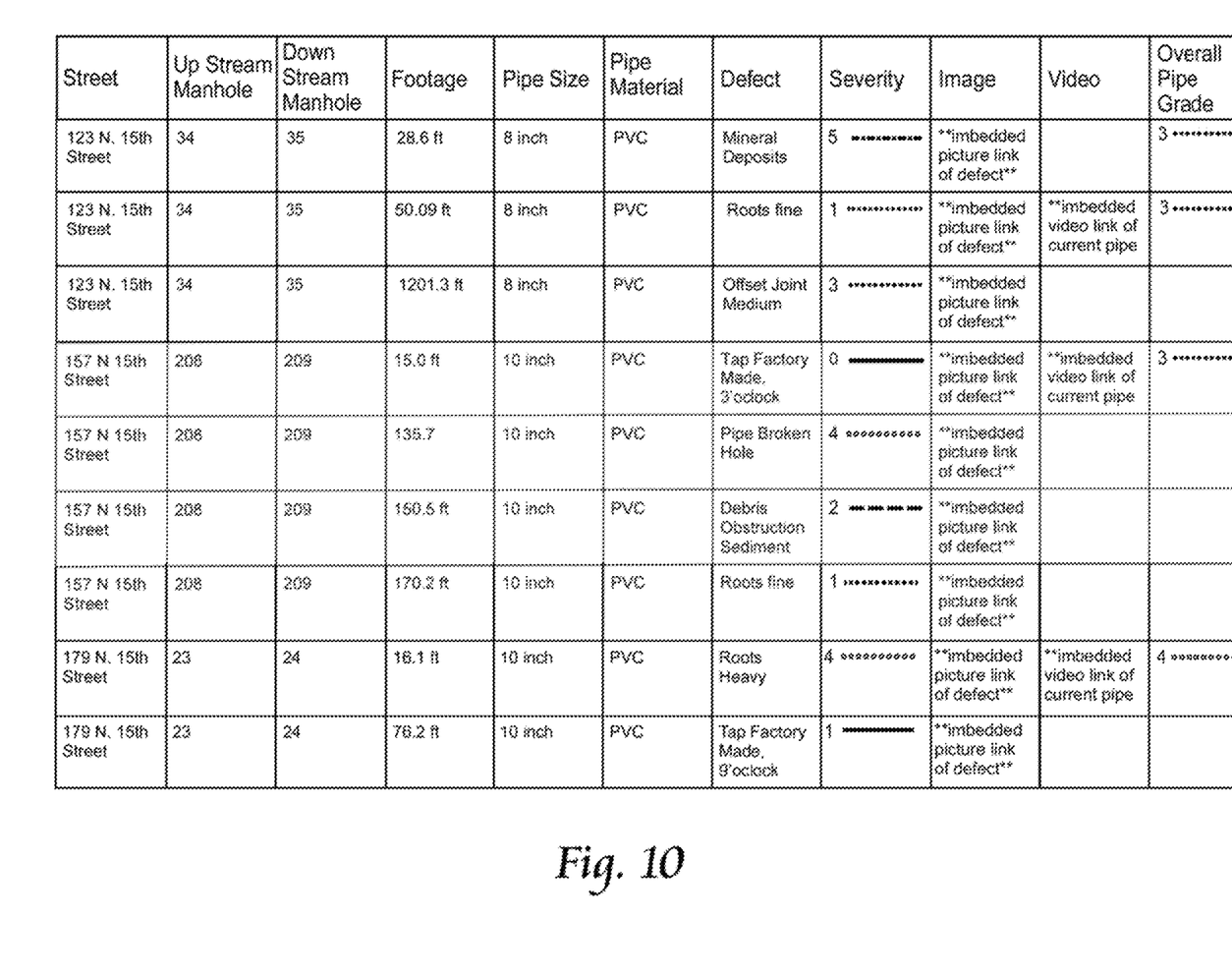
FIG. 10 is an example of a spreadsheet produced according to the present invention.

FIG. 10 provides an example of such a report. The report is preferably in the form of a spreadsheet, with the information in rows and columns. The information will be generated consistent with reports currently generated in the industry manually. For example, for every defect, there will be (but not limited to) footage marking where the defect is, severity, defect name, street location, pipe size and pipe material. The present analysis tool of the present invention also provides for a color coded grid system to note the defects in a system.

Still referring to FIG. 10, the sample report is directed towards a sewer system located in an undisclosed location for PII compliance. The report shows and demonstrates, among other things, various locations, defects, e.g. roots, mineral deposits, etc.), type of image or video used at each of the various locations, and a rating of the severity of a defect. In the noted sample report, the report also gives a rating from 0-5 for the severity of a defect, with a color code used as well (0=black, 1=green, 2=blue, 3=goldenrod (yellow), 4=magenta (pink), and 5=red). As discussed above, because the report is produced using the analysis tool, above, it is an objective report that is produced without an individual's selective or subjective views. Furthermore, the color-coded representation allows for a quick and efficient review of the report to determine whether a defect is not of concern (shown as green) or of high concern (shown as red) so that the user will quickly be drawn to areas to assess concerns.

For example, the report indicates that there were Roots Fine at 123 Fake Street with a severity of 1 (minor defect). An individual may view the video and image of that same footage and determine it's not of concern, as the individual may not be focused on roots fine, but rather break in the pipes. or, as demonstrated above with respect to FIGS. 3 and 5, above, a root that may be addressed as fine from initial observation may, in fact, be of medium or higher concern (e.g. FIG. 5) when adequately assessed with the present analysis tool. Because the present invention uses the analysis tool to take the footage and compare it to an established key (weights), the report will report the severity of the mineral deposit for future use. Thus, an individual or municipality has a report that can be assessed consistently with known standards, regardless of the individual reviewing the report.

Figure 11:
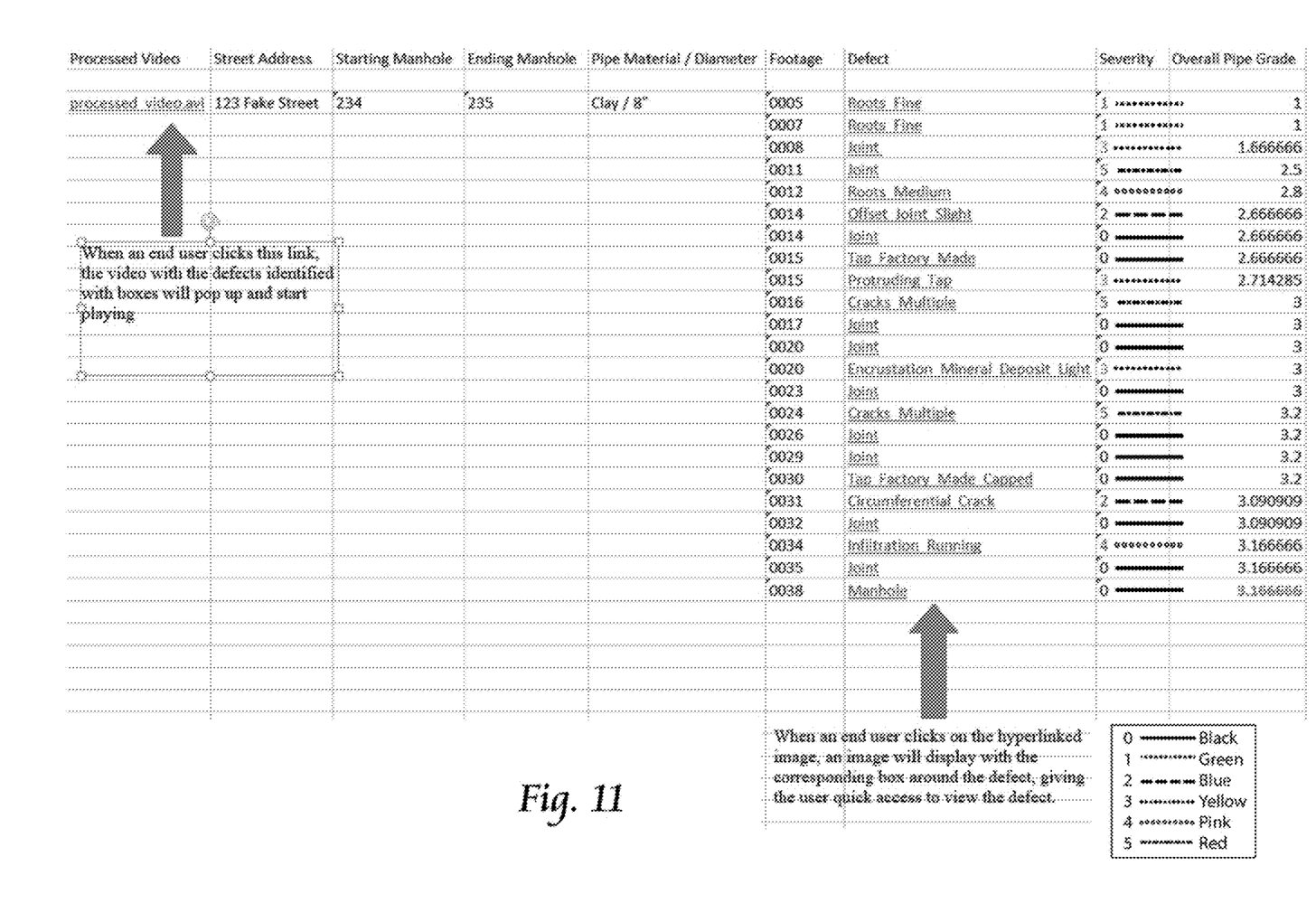
FIG. 11 is another example of a spreadsheet produced according to the present invention.
Figure 12A:
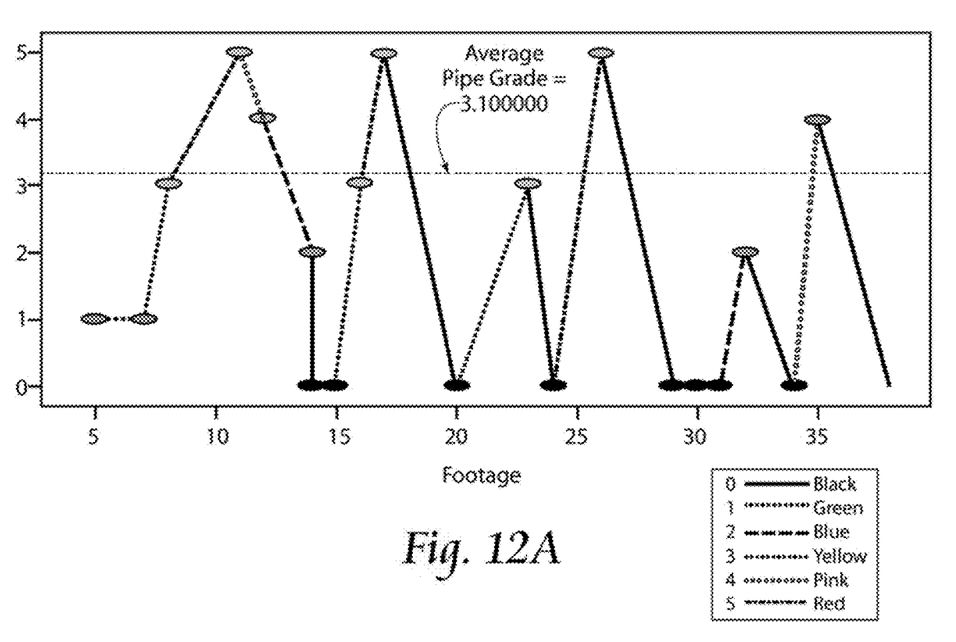
FIG. 12A is another example of a report for a sewer system according to the present invention.
Figure 12B:
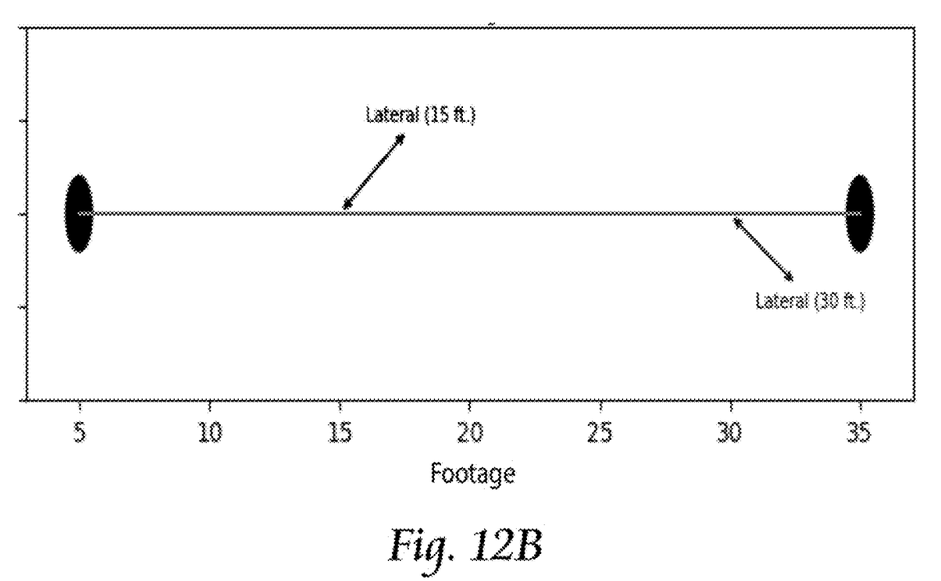
FIG. 12B is yet another example of a report for a sewer system according to the present invention.

FIGS. 11-12B provide further reports that can be generated according to the present invention. FIG. 11 demonstrates a spreadsheet analyzing video footage of a sewer system. The video was recorded and analyzed as described above, with the various recorded and analyzed defects listed in the spreadsheet. The defects are listed by location, type of defect, severity, and overall pipe grade for the pipe up to that location. In conjunction with the processed video, each of the defects has a link to the specific frame in the video for that defect, as well as a link to the entire video.

FIGS. 12A and 12B are graphs of the video footage analyzed in FIG. 11. The graph would likely accompany the spreadsheet in FIG. 11 and be used together with the spreadsheet. As noted above with respect to FIG. 10, the graphs and spreadsheets also give a rating from 0-5 for the severity of a defect, with a color code used as well (0=black, 1=green, 2=blue, 3=goldenrod (yellow), 4=magenta (pink), and 5=red). FIG. 12A plots the various defects noted in FIG. 11 with respect to the severity of the defect. For example, the plot point at five feet and a severity of 1 (green) corresponds to the first defect (roots fine) noted on the spreadsheet in FIG. 11. Likewise, the defect at eleven feet and severity of 5 (red) corresponds to a joint defect. FIG. 12A also graphs the overall average plot grade for the pipe (3.166, yellow). FIG. 12B correlated to the graph in FIG. 12A, showing where the laterals are located along the length of the sewer pipe. Together, the three Figures demonstrate provide an objective report that can be used in determining sewer pipe quality over time. When a future report is generated by the present invention for the same sewer pipe, the average pipe grade can be compared to determine how the grade has changed over time. An objective assessment is available, since there is a very high level of confidence that the comparison is an apples to apples comparison.

Figure 6:
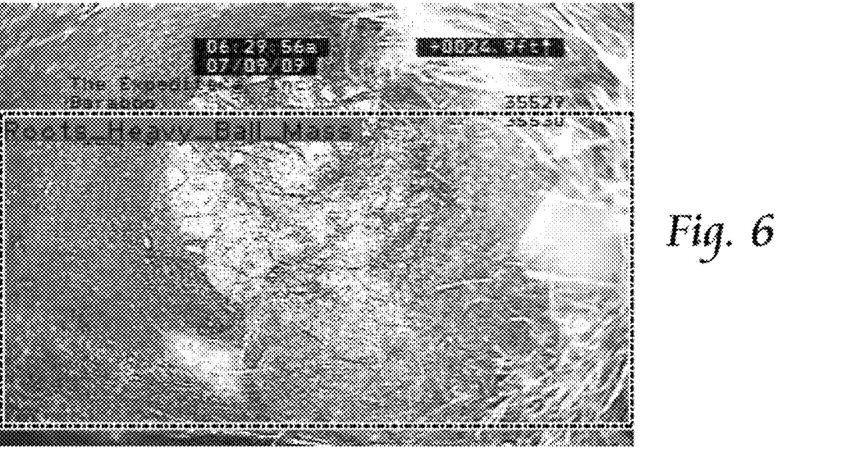
FIG. 6 provides a camera view of a sewer pipe

The use of the color-coding is consistently employed throughout the spreadsheet and videos, as is shown in FIGS. 3-6. When accessing the individual video frames from a spreadsheet, the links will maintain the color coding in the video so that the user will not have to go back and forth between the video and spreadsheet. For example, the video frame in FIG. 4 will be shown with a green border and the video frame in FIG. 5 is shown with the magenta border each time the video frame is accessed. Similarly, the videos shown in the other videos will have consistent and constant bordering (FIG. 2, black, FIG. 3, green, and FIG. 6, red).

The present invention utilizes the knowledge and understanding of the physical design of sewer and water piping to analyze these systems to report on defects in the system.

Because it is understood that the systems use cylindrical and curved surface conduits for transporting water and sewage, the key for the analysis tool is able to detect irregularities in surfaces that are not consistent with a cylindrical shape. As such, the present invention is also suitable with other public works projects. As an example, the analysis tool could be used to detect defects in a water dam.

By providing a properly calibrated Key (weighting system) for the analysis tool, the present invention can be used to detect defects in a surface with a known shape and contour. That is, once a key is established for a various object or surface, the present invention and analysis tool can be used to accurately map defects for that object. Other public works such as bridge underpasses, roadways, and tunnels could be monitored and analyzed using the present invention.

The present invention may also be utilized for various uses having curved or contoured surfaces. For example, the present system and analysis tool could be utilized by a doctor or physician for examining veins and blood vessels by analyzing the surfaces of the vessels to determine potential defects. The invention will allow for proper detection and analysis of defects in the circulatory system so that consistent treatment regimens will be implemented, regardless of the individual analyzing the raw data.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A system for analyzing a surface to determine defects in the surface, the system comprising:
   an input device for receiving images of said surface;
   a computer-based analysis tool for analyzing said images comprising an analysis routine and a weighted key;
   wherein said weighted key is formed by analyzing multiple images of related surfaces independently assessed from the images received from said input device,
   wherein the analysis tool compares said surface to said key to determine said defects and the severity of the defects in the surface.

2. The system of claim 1, wherein said surface is the internal surface of a sewer system.

3. A computer-method for analyzing a curved surface to determine defects in the curved surface, the method comprising the steps of:
   forming a key of related curved surfaces, said key being formed by assessment of independent curved surfaces related to said curved surface;
   providing a video of said curved surface, said video comprising multiple images of said curved surface;
   downloading the images;
   creating bound boxes to determine potential defects
   analyzing the images of said curved surface to said key to determine defects in said curved surface, said analyzing comprising multiple iterations of each of said images; and
   producing a report of said defects in said curved surface.

4. The method of claim 3 wherein multiple iterations are performed until the analysis provides a high certainty if a defect exists in said image.

5. The method of claim 3 wherein the curved surface comprises a sewer system.

6. A system for analyzing defects in the surface of a sewer system, the system comprising:
- an input device for receiving images of the said sewer system surface;
- a computer-based analysis tool comprising an analysis routine for reviewing said received images;
- a key formed by analyzing multiple images of related sewer surfaces independently assessed from the images received from said input device;
- a database of various defects created by said key;
- said analysis tool capable of comparing said received images to said database;
- a report issued by said system based on said comparison of said analysis tool with said key.

7. The system of claim 6 wherein the key provides a weighted analysis of sewer defects based on industry standards.

8. The system of claim 6 wherein said images of related sewer surfaces comprise pictures or videos.

9. The system of claim 8 wherein said images are converted to .txt files prior to review by said analysis tool.

10. The system of claim 9 wherein the images received by the input system comprises a video.

11. The system of claim 10 wherein the analysis tool reviews individual frames of each video.

12. The system of claim 11 further comprising a bounding box of said reviewed frames, said analysis tool designed to determine whether or not a defect is located in said bounding box, said bounding box recorded when said analysis tool confirms the existence of a defect or lack thereof in said bounding box.

13. The system of claim 12 wherein the report is a spreadsheet.

14. The system of claim 6 wherein the report is produced with a 95% or greater level of confidence.

* * * * *